US010237524B2

(12) United States Patent
Namba

(10) Patent No.: US 10,237,524 B2
(45) Date of Patent: Mar. 19, 2019

(54) LIGHTING DEVICE AND PROJECTION DISPLAY APPARATUS USING THE SAME

(71) Applicant: Panasonic Intellectual Property Management Co., Ltd., Osaka (JP)

(72) Inventor: Shu Namba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/654,077

(22) Filed: Jul. 19, 2017

(65) Prior Publication Data

US 2018/0041740 A1    Feb. 8, 2018

(30) Foreign Application Priority Data

Aug. 5, 2016 (JP) ................................ 2016-154849
Apr. 26, 2017 (JP) ................................ 2017-086770

(51) Int. Cl.
*H04N 9/31* (2006.01)
*F21V 13/04* (2006.01)
*F21V 8/00* (2006.01)

(52) U.S. Cl.
CPC .......... *H04N 9/3164* (2013.01); *F21V 13/04* (2013.01); *G02B 6/0001* (2013.01); *H04N 9/3129* (2013.01); *H04N 9/3161* (2013.01); *G02B 6/0013* (2013.01)

(58) Field of Classification Search
None
See application file for complete search history.

(56) References Cited

U.S. PATENT DOCUMENTS

| 2007/0024815 | A1* | 2/2007 | Oyama | G03B 21/16 353/54 |
| 2007/0115437 | A1 | 5/2007 | Shouji | |
| 2011/0222025 | A1 | 9/2011 | Sakaguchi | |
| 2012/0194748 | A1* | 8/2012 | Kakuta | G02B 5/005 348/744 |
| 2015/0192848 | A1* | 7/2015 | Okuno | G03B 21/2066 348/759 |
| 2016/0085142 | A1* | 3/2016 | Hirata | G02F 1/1336 353/100 |

FOREIGN PATENT DOCUMENTS

| JP | 2002-048999 | | 2/2002 |
| JP | 2004-177478 | | 6/2004 |
| JP | 2005070271 A | * | 3/2005 |
| JP | 2007-147757 | | 6/2007 |
| JP | 2010-091772 | | 4/2010 |
| JP | 2011-209697 | | 10/2011 |

* cited by examiner

Primary Examiner — Derek S. Chapel
(74) Attorney, Agent, or Firm — Wenderoth, Lind & Ponack, L.L.P.

(57) ABSTRACT

A lighting device includes a light source, a rod-integrator, a light guiding section for guiding light emitted from the light source to an incident face of the rod-integrator and a first reflecting plate. The first reflecting plate has a through-hole and is adjacent to the incident face of the rod-integrator with the rod-integrator being inserted into the through-hole of the first reflecting plate. The first reflecting plate is configured to reflect unnecessary light emitted from the light guiding section, the unnecessary light not entering incident light.

6 Claims, 8 Drawing Sheets

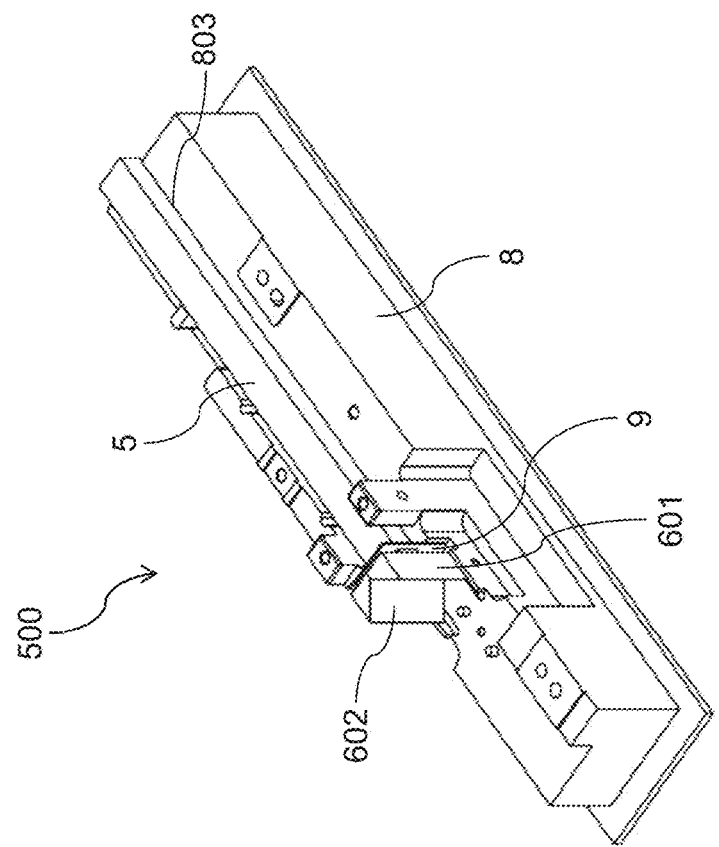
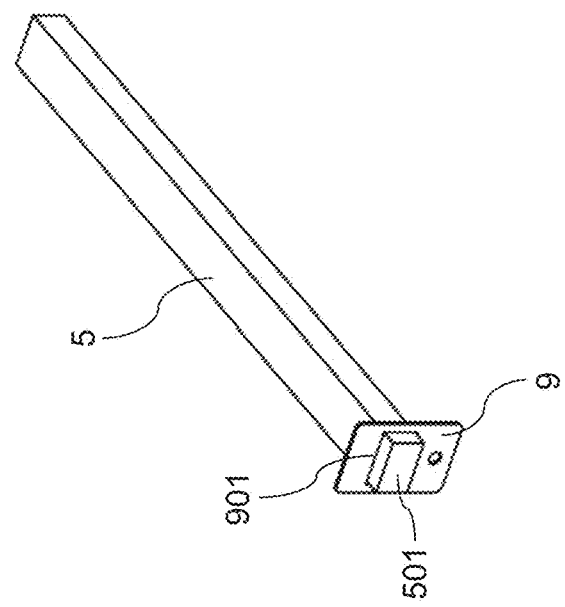

LIGHTING DEVICE AND PROJECTION DISPLAY APPARATUS USING THE SAME

BACKGROUND

Technical Field

The present disclosure relates to a lighting device including a rod-integrator, and it also relates to a projection display apparatus using the same lighting device.

Background Art

In a projection display apparatus, a light source emits light, which is then modulated by an image forming element formed of a DMD (digital micro-mirror device) or a liquid crystal panel. The modulated light forms image light before being projected onto a screen. To form projection image light free from unevenness in luminance, a light beam having a uniform intensity distribution within a face perpendicular to the optical axis should be guided to the image forming element. Nevertheless a light beam emitted from a light source generally has a great difference in intensities between the center and the circumference of the beam. A rod-integrator is an example of an optical element that can uniform the intensity distribution of the light beam emitted from the light source. The rod-integrator, in general, is formed of a rod-prism made from glass. This rod-prism is solid, viz. not hollow. The light emitted from the light source is guided as a convergent light beam to an incident face of the rod-integrator, then enters inside the rod-integrator, and reflects number of times from lateral faces depending on the incident angle. The reflections from the lateral faces are caused generally by total internal reflection produced due to a difference in refractive indexes between glass and air. During a travel of the incoming light in the rod-integrator, the foregoing mechanism allows the light in the center and the light in the circumference of the beam to mix with each other, whereby a light beam having a uniform intensity is obtained at the exit face.

Unexamined Japanese Patent Application No. 2007-147757 discloses a projection display apparatus including the rod-integrator discussed above. Unexamined Japanese Patent Application No. 2007-147757 also discloses a structure in which a light shielding plate is disposed for cutting off unnecessary light that will not enter the rod-integrator. This structure allows preventing a holder of the rod-integrator from being heated by the unnecessary light.

The structure disclosed in Unexamined Japanese Patent Application No. 2007-147757 has such a drawback as a part of light having passed through an opening of the light shielding plate travels to peripheral members including the holder of the rod-integrator. This light is actually not needed; however, the arrival of this light adversely affects the reduction in heating the peripheral members.

SUMMARY

The present disclosure provides a lighting device that can achieve an appropriate reduction in heating the peripheral members of the rod-integrator caused by the unnecessary light. The present disclosure also provides a projection display apparatus including the foregoing lighting device.

The lighting device of the present disclosure includes the following structural elements:
 a light source;
 a rod-integrator;
 a light guiding section for guiding light emitted from the light source to an incident face of the rod-integrator; and
 a first reflecting plate.

The first reflecting plate has an opening and is disposed closely to the incident face with the rod-integrator being inserted into the opening. This first reflecting plate reflects unnecessary light among light emitted from the light guiding section, the unnecessary light not entering the incident light.

The projection display apparatus of the present disclosure includes the following structural elements:
 the lighting device of the present disclosure;
 an image forming element being illuminated by the lighting device and forming an image in response to a video signal; and
 a projection lens for magnifying and projecting an image formed by the image forming element.

The structures discussed above allow achieving an appropriate reduction in heating, caused by the unnecessary light, the peripheral members of the rod-integrator.

BRIEF DESCRIPTION OF DRAWINGS

FIG. 3A is a perspective view illustrating a placement of the rod-integrator and a reflecting plate in the first embodiment.

FIG. 3B is a perspective view of the rod-integrator in the first embodiment.

DETAILED DESCRIPTION

Exemplary embodiments of the present disclosure are detailed hereinafter with reference to the accompanying drawings. Descriptions more than necessary are sometimes omitted. For instance, descriptions about well-known matters are omitted, and substantially the same structures are not described again in order to avoid duplications for the ordinary skilled persons in the art to readily understand the present disclosure. The accompanying drawings and the descriptions below are provided for the ordinary skilled persons in the art to fully understand the present disclosure, and these materials will not limit the scope of the claims.

First Exemplary Embodiment

The first embodiment is demonstrated hereinafter with reference to FIG. 1 and FIG. 2.

1-1. Structure

Figure 1:
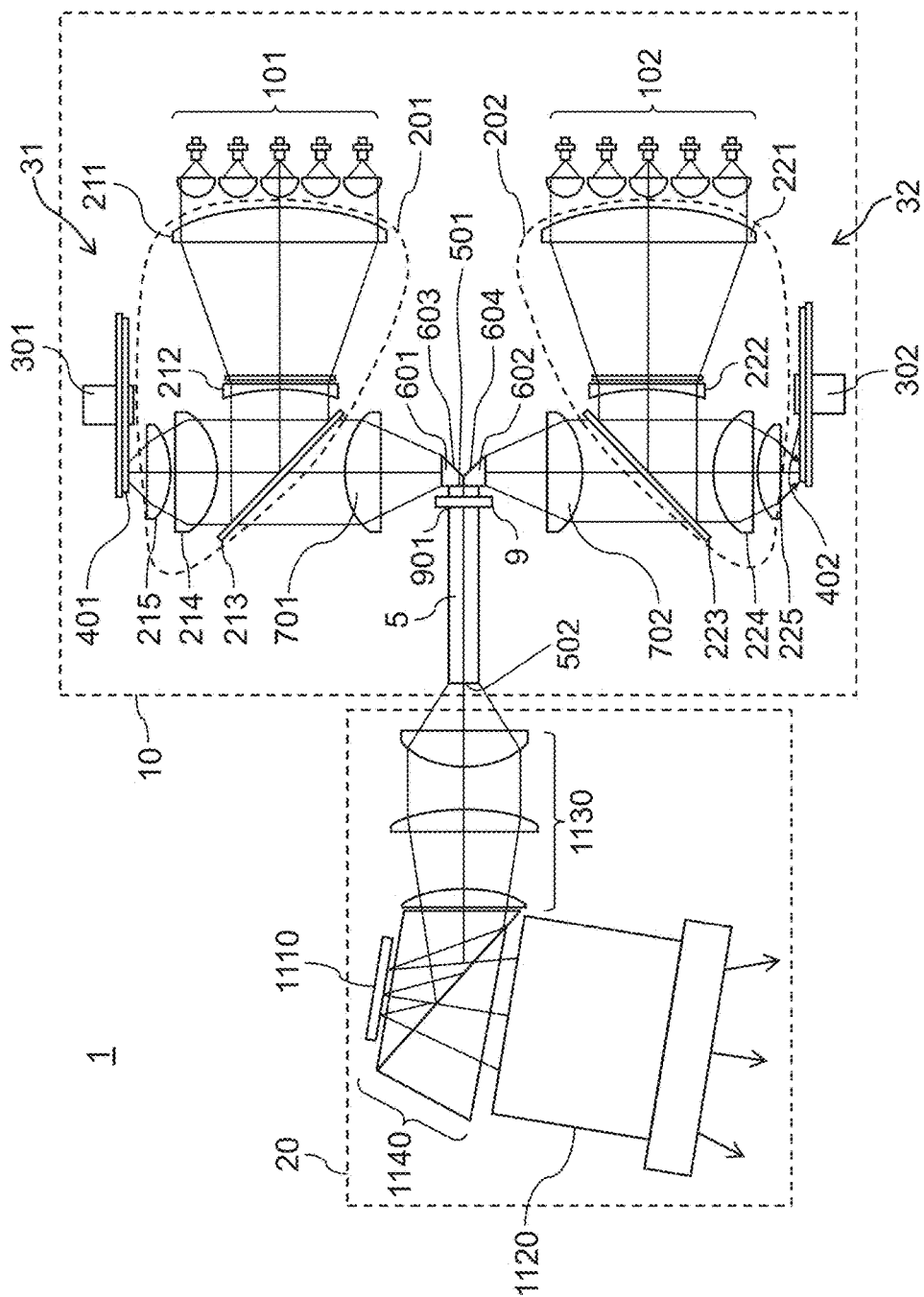
FIG. 1 shows a structure of a projection display apparatus in accordance with a first embodiment.

FIG. 1 shows a structure of a projection display apparatus in accordance with the first embodiment. Projection display apparatus 1 includes lighting device 10 and projecting section 20. Lighting device 10 comprises the following structural elements:
- multiple semiconductor light sources 101, 102;
- composite optical systems 201, 202;
- rotary wheels 301, 302;
- rod-integrator 5;
- prisms 601, 602; and
- condenser lenses 701, 702.

Composite optical systems 201, 202 include multiple lenses 211, 212, 214, 215, 221, 222, 224, 225, and dichroic mirrors 213, 223. Projecting section 20 includes multiple lenses 1130, prisms 1140, digital micro mirror device 1110 (DMD 1110), and projection lens 1120.

Semiconductor light source 101 is formed of multiple blue laser diodes, and emits an excitation blue laser beam, which travels through composite optical system 201 before being guided to phosphor 401 disposed on rotary wheel 301, whereby phosphor 401 emits fluorescent light. The area of phosphor 401 is divided circumferentially on rotary wheel 301 in response to colors to be emitted, so that rotary wheel 301 emits fluorescent light of individual colors in time-division manner. The fluorescent light emitted from phosphor 401 travels through condenser lens 701, and enters prism 601 before being reflected from reflecting face 603 of prism 601. This reflected light focuses on incident face 501 of rod-integrator 5. Composite optical system 201, rotary wheel 301, condenser lens 701, and prism 601 form light guiding section 31 that guides the light emitted from semiconductor light source 101 to incident face 501 of rod-integrator 5.

Semiconductor light source 102 is formed of multiple blue laser diodes, and emits excitation blue laser light, which travels through composite optical system 202 before being guided to phosphor 402 disposed on rotary wheel 302, whereby phosphor 402 emits fluorescent light. The area of phosphor 402 is divided circumferentially on rotary wheel 302 in response to colors to be emitted, so that rotary wheel 302 emits fluorescent light of individual colors in time-division manner. The fluorescent light emitted from phosphor 402 travels through condenser lens 702, and enters prism 602 before being reflected from reflecting face 604 of prism 602. This reflected light focuses on incident face 501 of rod-integrator 5. Composite optical system 202, rotary wheel 302, condenser lens 702, and prism 602 form light guiding section 32 that guides the light emitted from semiconductor light source 102 to incident face 501 of rod-integrator 5.

Multiple semiconductor light sources 101, 102 emit lights, which enter rod-integrator 5, and these incident lights repeat reflections within rod-integrator 5, whereby the lights are mixed together. As a result, the light having a uniform illuminance distribution outgoes from exit face 502 of rod-integrator 5.

The outgoing light from exit face 502 of rod-integrator 5 travels through multiple lenses 1130 of projecting section 20 and prisms 1140, and then is guided to DMD 1110, and the light is modulated by DMD 1110. This modulated light is emitted from projection lens 1120.

Figure 2:
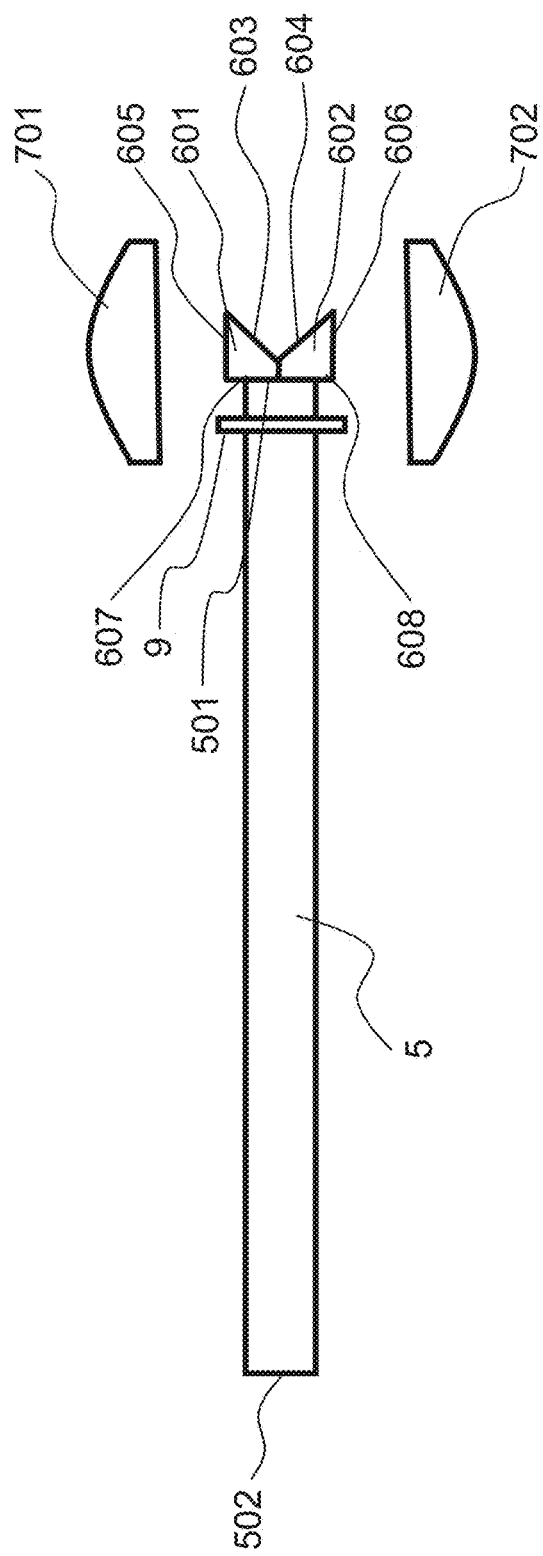
FIG. 2 is an enlarged view of a periphery of a rod-integrator of the projection display apparatus in accordance with the first embodiment.

FIG. 2 is an enlarged view of a periphery of rod-integrator 5 of the projection display apparatus in accordance with the first embodiment. Incident face 501 of rod-integrator 5 is disposed confronting exit faces 607, 608 of prisms 601, 602. Incident faces 605, 606 of prisms 601, 602 confront planes of condenser lenses 701, 702. The light transmits through condenser lenses 701, 702, and focuses on incident face 501 of rod-integrator 5 with the aid of prisms 601, 602. At this time, the outgoing lights from faces 607, 608 of prisms 601, 602 are not always converged on incident face 501 of rod-integrator 5. Some of the outgoing lights leak outside incident face 501. Projection display apparatus 1 in accordance with this embodiment thus includes reflecting plate 9 (first reflecting plate) that reflects the leakage light (unnecessary light) around incident face 501 of rod-integrator 5, and diffuses the leakage light to the peripheral region.

FIG. 3A is a perspective view illustrating a placement relation between rod-integrator 5 and reflecting plate 9. As FIG. 3A shows, rod-integrator 5 shapes like a rod, and the both ends of this rod are vertical to the longer side, and the both ends form rectangles. Rod-integrator 5 is situated such that its first end is inserted into opening 901 of reflecting plate 9 and disposed close to incident face 501 of rod-integrator 5. This close position refers to a position distant from incident face 501 of rod-integrator 5 toward exit face 502 by a given distance. The given distance allows maintaining reflecting plate 9 at a temperature not exceeding a given temperature even reflecting plate 9 is heated by the unnecessary light leaks around incident face 501 of rod-integrator 5. A closer placement of reflecting plate 9 to incident face 501 will cause the temperature of reflecting plate 9 per se to rise too much. To the contrary, a farther placement of reflecting plate 9 from incident face 501 does not allows reflecting sufficiently the unnecessary light, so that the temperature of the peripheral members of rod-integrator 5 cannot be prevented from rising. The given distance thus should be set within such a range as allowing to prevent the temperature of reflecting plate 9 in use from rising not greater than a given degree.

The surface of reflecting plate 9 is provided with mirror finish to reflect light excellently. Reflecting plate 9 has greater sizes (area) in vertical and lateral lines than those of incident face 501 of rod-integrator 5, exit faces 607, 608 of prisms 601, 602. Opening 901 of reflecting plate 9 has dimensions slightly greater than the cross section (vertical and lateral lines) of incident face 501 of rod-integrator 5 so that fine gaps can be produced between each lateral face of rod-integrator 5 and opening 901. Since the temperature-rise of reflecting plate 9 and others will cause the dimensions (vertical and lateral lines, viz. area) of opening 901 of reflecting plate 9 to be reduced, the foregoing slightly greater dimensions are set within such a minimum range that the dimensions (vertical and lateral lines, viz. area) of opening 901 of reflecting plate 9 not becomes smaller, during the temperature-rise, than the dimensions (vertical and lateral lines, viz. cross section) of incident face 501. This structure allows preventing the light from leaking as little as possible through the gap between rod-integrator 5 and opening 901 of reflecting plate 9.

Reflecting plate 9 is formed of one plate-like sheet having opening 901, nevertheless, it can be formed by combining multiple plates. In this case, an adjustment in the combination of multiple plates will allow varying a size of the opening of the reflecting plate.

FIG. 3B is a perspective view of a rod-integrator unit in accordance with the first embodiment. As FIG. 3B shows, rod-integrator unit 500 includes rod-integrator 5, holder 8, prisms 601, 602, and reflecting plate 9. Rod-integrator 5 and reflecting plate 9 are mounted to holder 8. Prisms 601, 602 are rigidly mounted to holder 8 with their exit faces 607, 608 being brought into contact to incident face 501 of rod-integrator 5. Holder 8 has groove 803 extending longitudinally, and rod-integrator 5 is fit into groove 803 and fixed thereto with adhesive. One of the lateral faces and a top face of rod-integrator 5 are pushed down by a spring (not shown). Reflecting plate 9 is rigidly mounted to holder 8 with screws.

Holder 8 is formed of good heat-dissipation metal such as aluminum. A housing (not shown) that accommodates rod-integrator unit 500 is formed of also good heat-dissipation metal such as aluminum. Holder 8 forms a part of the housing.

1-2. Description of Specific Problems

Figure 4:
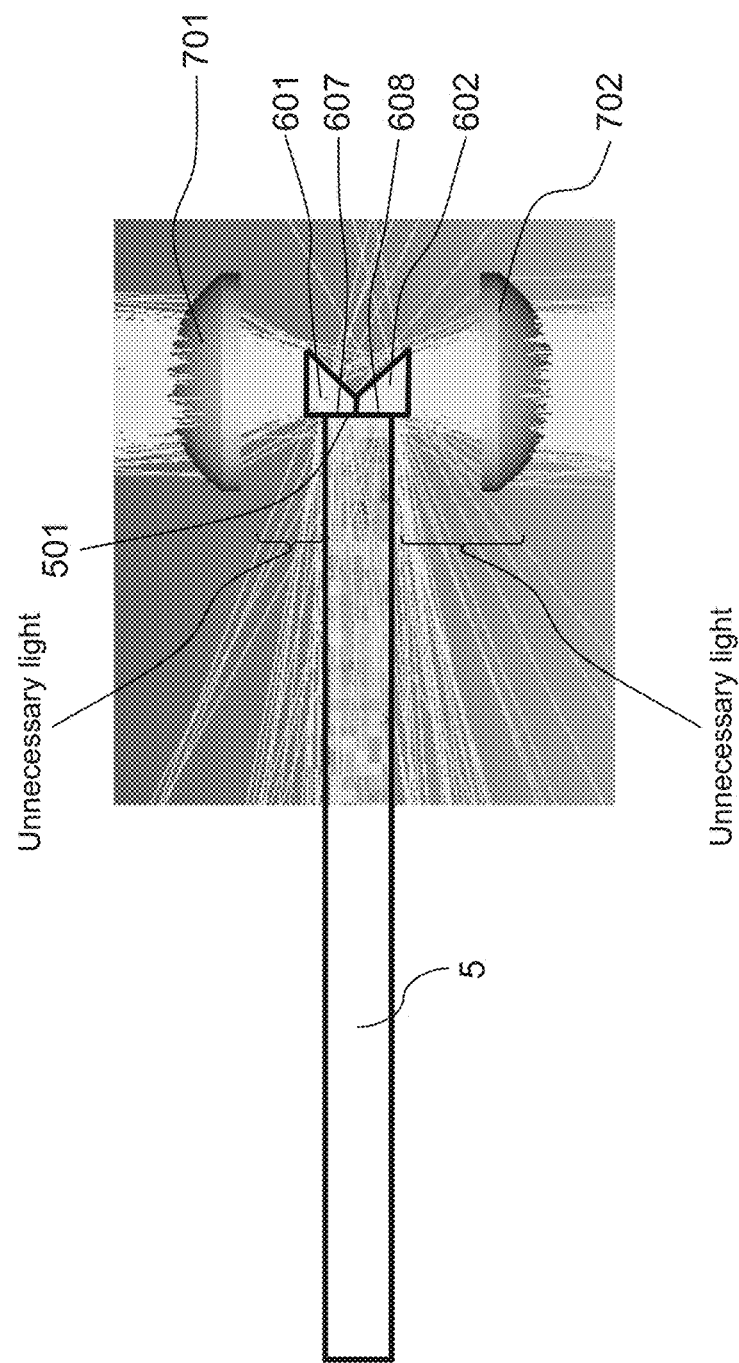
FIG. 4 illustrates unnecessary light around the rod-integrator in the first embodiment.

The problems to be solved by the present disclosure are specifically described with reference to FIG. 4, which illustrates unnecessary light of a rod-integrator unit built for a comparison purpose. This rod-integrator unit omits reflecting plate 9 from rod-integrator unit 500 in accordance with the first embodiment. As FIG. 4 shows, light transmits through condenser lens 701 (the light is shown with numerous white lines), and then focuses on incident face 501 of rod-integrator 5 with the aid of prisms 601, 602. At this time, the outgoing light from exit faces 607, 608 of prisms 601, 602 does not always gather or enter into incident face 501 of rod-integrator 5, but some of the light leaks to the vicinity of rod-integrator 5. The leakage light (unnecessary light) is illuminated to holder 8 (refer to FIG. 3B) that holds rod-integrator 5, so that holder 8 is heated.

Heating the holder 8 will allow rod-integrator 5 to move slightly with respect to holder 8 every time of contraction or expansion of holder 8 and rod-integrator 5 due to a difference in thermal expansion coefficients between holder 8 and rod-integrator 5. This slight move causes a positional deviation, or deformation of holder 8 due to a change in strength of other members (not shown) to which holder 8 is attached. This deformation also causes a positional deviation of rod-integrator 5. These positional deviations cause lowering a luminance of an image projected from a projection display apparatus, and the reliability of the projection display apparatus cannot be maintained.

To prevent the positional deviation caused by the difference in thermal expansion coefficients between holder 8 and rod-integrator 5, an adhesive can be applied between holder 8 and rod-integrator 5; however, the adhesive of high heatproof temperature is needed, and workers in an assembly line must pay attention to this kind of adhesive about a curing time, a curing method, and other remarks. Use of the adhesive of high heatproof temperature will thus cause cumbersome problems.

Unexamined Japanese Patent Application No. 2007-147757 also aims to prevent the holder of the rod-integrator from being heated by the unnecessary light, so that a light shielding plate is disposed distant from the incident face of the rod-integrator toward the light source in order to prevent the unnecessary light from being transmitted. To be more specific, the light shielding plate is disposed distant from an opening of a protection tube, which accommodates the rod-integrator therein, toward the light source. This opening is provided on the incident light side of the tube. The light shielding plate has an opening for the light to travel to the rod-integrator.

The opening of the light shielding plate disclosed in Unexamined Japanese Patent Application No. 2007-147757 should be rather greater than the incident face of the rod-integrator so that effective light supplied from the light source cannot be cut off by the light shielding plate. This structure allows the apparatus disclosed in Unexamined Japanese Patent Application No. 2007-147757 to guide the light, with no loss, to the rod-integrator. Nevertheless, the greater opening as discussed above allows the protection tube to be subjected to intense light, so that the protection tube tends to be heated.

The market demands that the projection display apparatus need to display an image with more luminance. One of the methods to increase the luminance is to boost an input power to the light source. However, a greater input power to the light source will increase the temperature of the light source beyond tolerance, so that a reasonable service life cannot be expected.

To overcome this problem, this first embodiment prepares multiple light sources (semiconductor light sources 101, 102) instead of boosting the input power to the light source. The lights supplied from these multiple light sources are composited, and then the composited light is guided to rod-integrator 5. To be more specific, multiple semiconductor light sources 101, 102 emit light, and then the light is guided to rod-integrator 5 with the aid of multiple prisms 601, 602.

With this structure, assume that the light shielding plate is disposed on the light source side of incident face 501 as disclosed in Unexamined Japanese Patent Application No. 2007-147757. In this case, the light shielding plate is required to be placed around incident face 501 of rod-integrator 5, viz. near the focal point, because of limited space. This placement causes a temperature of the light shielding plate to rise, and produces a heat distortion in the light shielding plate, which then sometimes cannot work properly.

1-3. Mechanism

To overcome the foregoing problems, this first embodiment prepares reflecting plate 9 distant by a given distance from incident face 501 of rod-integrator 5 toward exit face 502 with rod-integrator 5 being inserted into opening 901 of reflecting plate 9.

With this structure, projection display apparatus 1 in accordance with the first embodiment emits light from exit faces 607, 608 of prisms 601, 602. Among these outgoing light, unnecessary light that will not enter incident face 501 of rod-integrator 5 is reflected from reflecting plate 9.

The foregoing mechanism allows reducing the illumination of the unnecessary light to the members, such as holder 8, disposed around rod-integrator 5, thereby preventing holder 8 substantially from being heated. As a result, the positional deviation of rod-integrator 5 cannot be produced. On top of that, an adhesive of a lower heat-proof temperature can be used than that of a case where reflecting plate 9 is not used, so that the assembly work can be done more efficiently.

As discussed above, the first embodiment proves that projection display apparatus 1 can maintain a high luminance for a long period.

1-4. Advantage

Lighting device 10 in accordance with the first embodiment comprises the following structural elements:

semiconductor light sources 101, 102 (light source);

rod-integrator 5;

light guiding sections 31, 32 for guiding light emitted from semiconductor light sources 101, 102 to incident face 501 of rod-integrator 5; and reflecting plate 9 (first reflecting plate).

Reflecting plate 9 has opening 901, and is disposed closely to incident face 501 with rod-integrator 5 being inserted into opening 901. Reflecting plate 9 reflects light, which will not enter incident face 501, among light emitted from light guiding sections 31, 32 (i.e. reflects unnecessary light).

The structure discussed above allows preventing appropriately peripheral members around rod-integrator 5 from being heated by the unnecessary light.

In lighting device 10, opening 901 is slightly greater in area by a given small amount than incident face 501.

This structure allows reducing leakage light from between the rim of opening 901 and lateral faces of rod-integrator 5.

Light guiding sections 31, 32 of lighting device 10 include prisms 601, 602 (i.e. light-traveling path changing members) that change traveling paths of the light from semiconductor light sources 101, 102 and emit the light to incident face 501 of rod-integrator 5. Incident face 501 of rod-integrator 5 confronts exit faces 607, 608 of prisms 601, 602. Reflecting plate 9 reflects the unnecessary light, which will not enter incident face 501 of rod-integrator 5, among the outgoing light from exit faces 607, 608 of prisms 601, 602.

This structure allows preventing appropriately the peripheral members around rod-integrator 5 from being heated by the unnecessary light, which will not enter incident face 501 of rod-integrator 5, among the outgoing light from exit faces 607, 608 of prisms 601, 602.

Projection display apparatus 1 in accordance with the first embodiment comprises the following structural elements:
  lighting device 10;
  DMD 1110 (image forming element) illuminated by lighting device 10 for forming an image in response to a video signal; and
  projection lens 1120 for magnifying and projecting the image formed by DMD 1110.

This structure allows projection display apparatus 1 to achieve the foregoing advantages.

Second Exemplary Embodiment

The second embodiment is demonstrated hereinafter with reference to FIG. 5. Descriptions of the same structures as those in the first embodiment are omitted here to avoid duplication. Only different structures are described.

2-1. Structure

Figure 5:
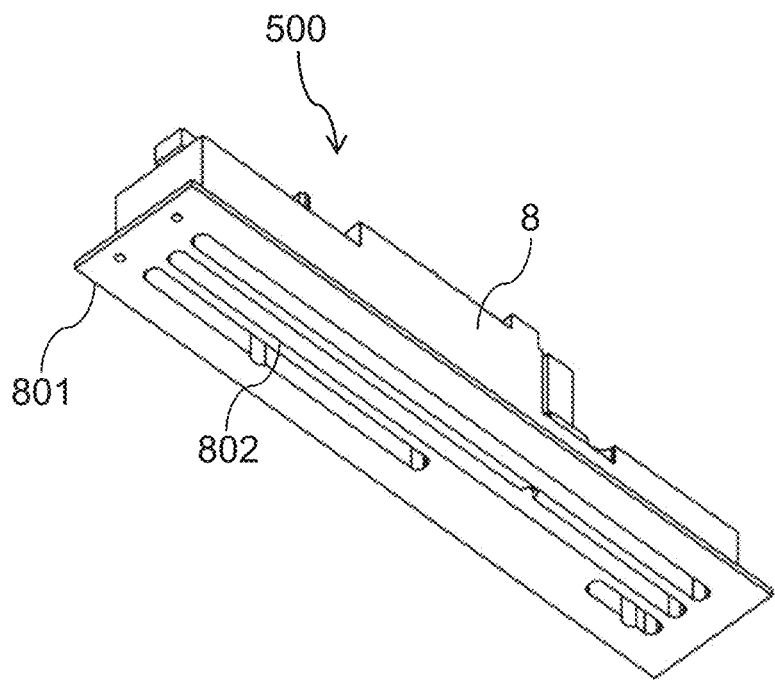
FIG. 5 is a perspective view of a rod-integrator in accordance with a second embodiment.

FIG. 5 is a perspective view of a rod-integrator unit employed in a projection display apparatus in accordance with the second embodiment. A housing that accommodates rod-integrator 5, prisms 601, 602 has a hermetic structure to prevent dust from attaching to these optical components. The heat generated in this hermetic housing needs to be dissipated properly. Lid 801 of the hermetic housing is unitarily formed with holder 8, and yet, lid 801 has groves on its surface, viz. an outer face of the housing, so that fin-shaped heat radiator 802 can be formed on an exterior of the housing. This structure allows the heat generated in rod-integrator 5, holder 8, reflecting plate 9, and others to be dissipated to outside the housing efficiently via heat radiator 802. The temperatures of rod-integrator 5, holder 8, reflecting plate 9, and others can be thus reduced more efficiently so that the positional deviation, caused by the difference in heat expansion coefficients, discussed previously can be properly prevented. Projection display apparatus 1 featuring a higher luminance, which though causes an increment in heat generation, employs the hermetic structure in the housing so that the luminance can be prevented from being lowered by the dust.

2-2. Advantage

In this second embodiment, holder 8 that holds rod-integrator 5 is unitarily formed with lid 801 of the housing that accommodates rod-integrator 5. Lid 801 has fin-shaped heat radiator 802 on its face, viz. an outer face of the housing.

This structure allows the heat generated from rod-integrator 5, holder 8, reflecting plate 9 and others to radiate outside the housing efficiently via heat radiator 802 formed on lid 801. This advantage is additional one to what is discussed in the first embodiment.

Third Exemplary Embodiment

The third embodiment is demonstrated hereinafter with reference to FIG. 6. Descriptions of the same structures as those in the first embodiment are omitted here to avoid duplication. Only different structures are described.

3-1. Structure

Figure 6:
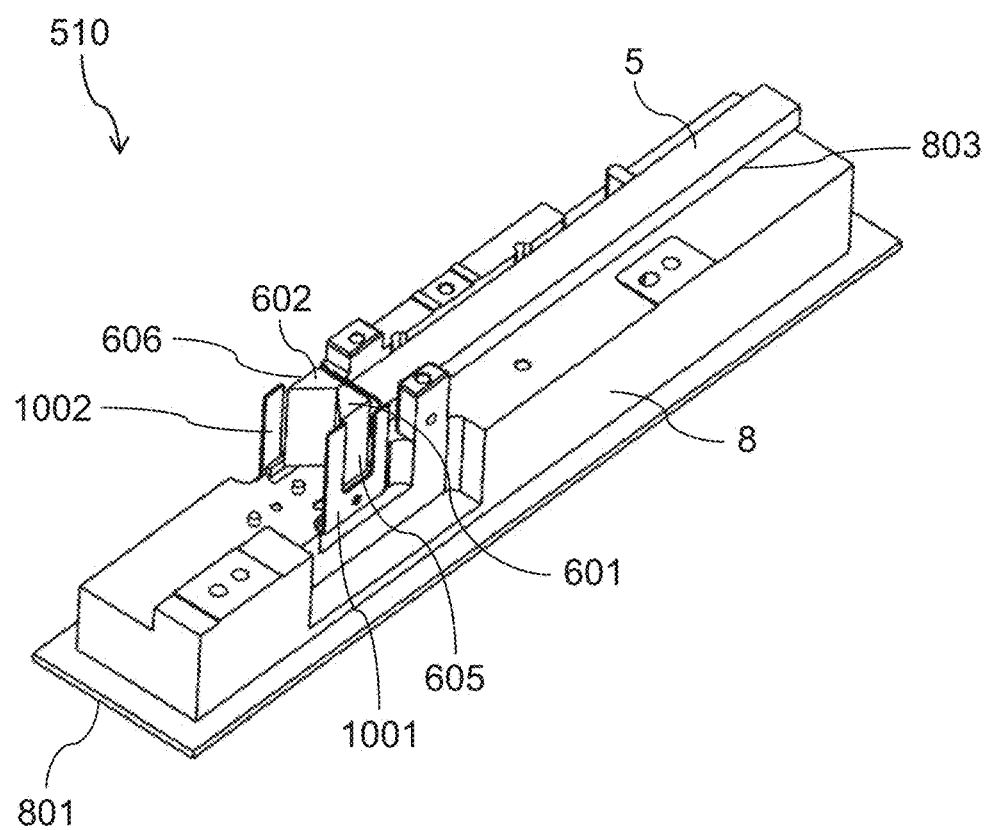
FIG. 6 is a perspective view of a rod-integrator in accordance with a third embodiment.

FIG. 6 is a perspective view of a rod-integrator unit of a projection display apparatus in accordance with the third embodiment. As FIG. 6 shows, rod-integrator unit 510 includes reflecting plates 1001, 1002 near incident faces 605, 606 of prisms 601, 602 in addition to the structure of rod-integrator unit 500 discussed in the first embodiment. Each of these two reflecting plates 1001, 1002 has a U-shaped cut-out section of which area is approx. the same as each area of incident faces 605, 606. Reflecting plates 1001, 1002 are placed closely to each other this side of incident faces 605, 606 of prisms 601, 602 along a light incident direction, and are rigidly mounted to holder 8 with screws. The shape of reflecting plates 1001, 1002 can be not always the U-shape, but it can be a rectangle having an opening similar to the shape of reflecting plate 9.

The structure discussed above allows unnecessary light that will not enter incident faces 605, 606 to be reflected from reflecting plates 1001, 1002, so that the unnecessary light can be more effectively prevented from illuminating holder 8.

3-2. Advantage

Lighting device 10 in accordance with the third embodiment further includes reflecting plates 1001, 1002 (second reflecting plates) around incident faces 605, 606 of prisms 601, 602. These reflecting plates 1001, 1002 reflect the unnecessary light that will not enter incident faces 605, 606 of prisms 601, 602.

This structure allows preventing the unnecessary light, which will not enter incident faces 605, 606 of prisms 601, 602, from illuminating the holder 8 disposed around rod-integrator 5 more efficiently than the advantage discussed in the first embodiment.

Fourth Exemplary Embodiment

The fourth embodiment is demonstrated hereinafter with reference to FIG. 7 and FIG. 8. Descriptions of the same structures as those in the first embodiment are omitted here to avoid duplication. Only different structures are described.

Figure 7:
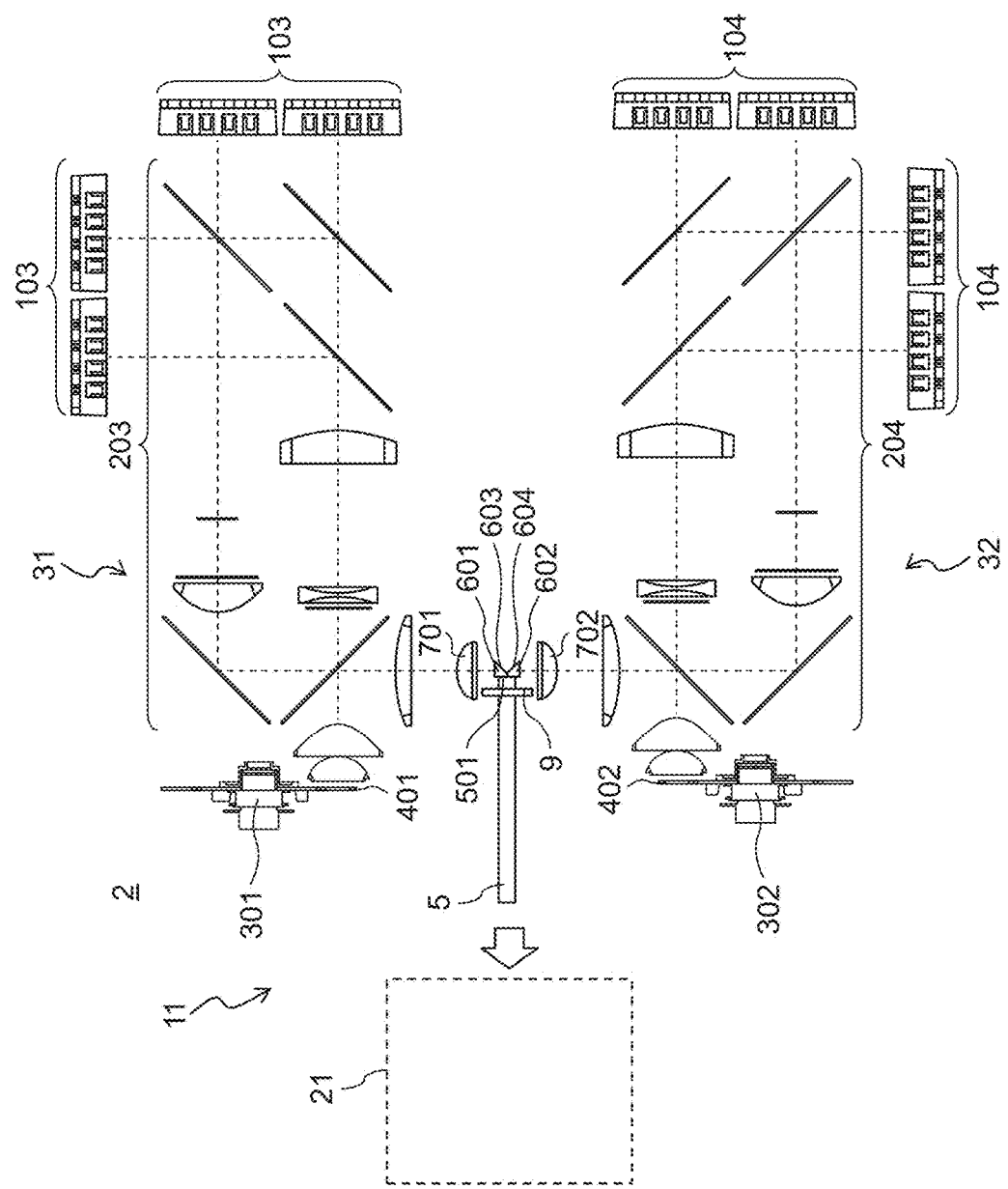
FIG. 7 shows a structure of a lighting device used in a projection display apparatus in accordance with a fourth embodiment.

FIG. 7 shows a structure of a lighting device of a projection display apparatus in accordance with the fourth embodiment. Projection display apparatus 2 includes lighting device 11 and projecting section 21. Lighting device 11 includes semiconductor light sources 103, 104 that are counterparts of semiconductor light sources 101, 102 used in the first embodiment, and composite optical systems 203, 204 that are counterparts of composite optical systems 201, 202 used in the first embodiment. In this fourth embodiment, a greater number of laser diodes forming semiconductor light sources 103, 104 than that in the first embodiment allows achieving a higher luminance. To increase the number of laser diodes, each of semiconductor light sources 103 is formed of laser diodes of which outgoing light intersects at right angles with outgoing light from the other laser diodes of another semiconductor light source 103. Each of semiconductor light sources 104 is formed similarly to semiconductor light sources 103. The outgoing light beams from the laser diodes intersecting with each other are composited by composite optical systems 203, 204. Composite optical systems 203, 204 include multiple mirrors (including dichroic mirrors) and lenses for condensing the outgoing light supplied from multiple semiconductor light sources 103, 104 on a plurality of prisms 601, 602. Descriptions of the traveling paths in composite optical systems 203, 204 are omitted here because this subject digresses from the gist of the present disclosure. Rod-integrator unit 500 including rod-integrator 5, holder 8, reflecting plate 9, and others has a structure similar to that described in the first embodiment. The greater number of laser diodes that form the semiconductor light source causes the light converged to rod-integrator 5 to be more luminous. Reflecting plate 9 prepared in this embodiment appropriately prevent the temperatures of rod-integrator 5 and holder 8 from rising. Rod-integrator unit 510 used in the third embodiment can be used here instead of rod-integrator unit 500.

Figure 8:
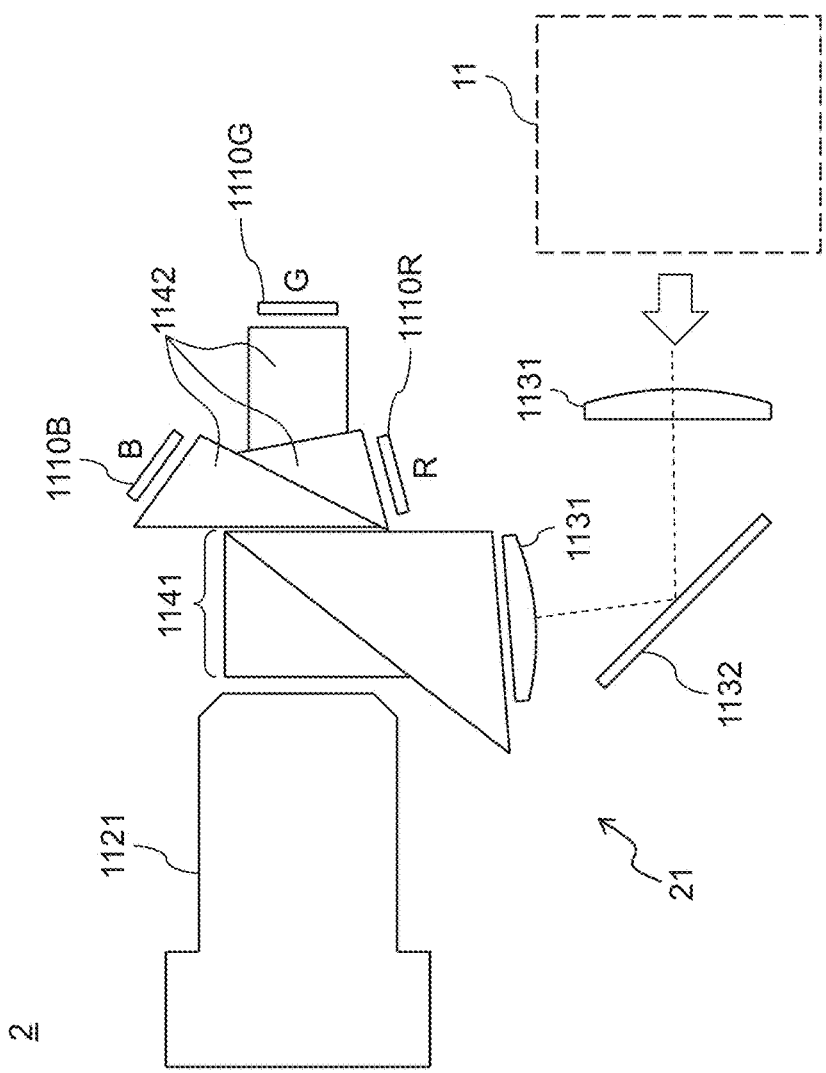
FIG. 8 shows a structure of a projecting section in the projection display apparatus in accordance with the fourth embodiment.

FIG. 8 shows a structure of the projecting section of the projection display apparatus in accordance with this fourth embodiment. In the first embodiment previously discussed, projecting section 20 includes one DMD 1110 shared with each color of RGB. Nevertheless, projecting section 21 in this fourth embodiment includes three DMDs, viz. DMD 1110R, DMD 1110G, and DMD 1110B for respective colors R, G, and B. Lighting device 11 is formed similarly to that shown in FIG. 7.

Outgoing white light from lighting device 11 enters prisms 1141 via lens 1131 and mirror 1132, then the light which enters prisms 1141 reflects from a fine air gap of prisms 1141 and then enters color prism 1142 formed of the three prisms. Color prism 1142 separates the white light into three colors, viz. R, G, and B. These three colors enter respectively DMD 1110R, 1110G, and 1110B.

The three DMDs (DMD 1110R, 1110G, and 1110B) are driven by a video circuit (not shown), and switch ON/OFF of each pixel in response to image information, thereby modulating the incident light. The light from the switched-on pixels of the three DMDs (DMD 1110R, 1110G, and 1110B) is composited by color prism 1142, and then transmit through prisms 1141 before being magnified and projected onto a screen (not shown) through projection lens 1121.

Other Embodiments

The embodiments discussed previously are provided in order to exhibit examples of the techniques disclosed in the present disclosure with the aid of accompanying drawings and detailed descriptions. Some of the structural elements shown in the drawings and descriptions are not essential for solving the problems, but they are used only for exemplifying the techniques. The entry of these non-essential elements in the drawings or the descriptions should not be construed as essential ones. Since the embodiments discussed previously exemplify the techniques of the present disclosure, the scope of the claims can undergo changes, replacements, additions, or omissions as far as they do not cause any deviation from the gist of present disclosure.

The first embodiment discloses lighting device 10 and projection display apparatus 1, in which the outgoing light from two systems of semiconductor light sources 101, 102 travels through light guiding sections 31, 32 having prisms 601, 602 (light-traveling-path changing members), and the light enters incident face 501 of rod-integrator 5. Nevertheless, the present disclosure can be applicable to the lighting device and the projection display apparatus that include one system of a light source and a light guiding section having no light-traveling-path changing member. The outgoing light from the one system of the light source is guided, not via the light-traveling-path changing member, to the incident face of the rod-integrator. For instance, only the one system of semiconductor light source 101 is prepared, but prisms 601, 602 are not prepared. The outgoing light from semiconductor light source 101 is guided to incident face 501 of rod-integrator 5 via the light guiding section (formed of composite optical system 201, rotary wheel 301, and condenser lens 701). The present disclosure is also applicable to the lighting device and the projection display apparatus discussed above. In this case, semiconductor light source 101, composite optical system 201, rotary wheel 301, and condenser lens 701 can be placed appropriately so that the light being transmitted through condenser lens 701 can be condensed onto incident face 501 of rod-integrator 5.

INDUSTRIAL APPLICABILITY

The present disclosure can be widely used in lighting devices including rod-integrators or in projection display apparatuses equipped with the same lighting devices.

What is claimed is:

1. A lighting device comprising:
   a light source;
   a rod-integrator including an incident face;
   a light guiding section for guiding light emitted from the light source to the incident face of the rod-integrator; and
   a first reflecting plate including a reflection face and a through-hole defined in the reflection face,
   wherein the first reflecting plate is adjacent to the incident face of the rod-integrator with the rod-integrator being inserted into the through-hole of the first reflecting plate, and wherein the first reflecting plate is configured to reflect unnecessary light emitted from the light guiding section, the unnecessary light not entering the incident face of the rod-integrator; and
   wherein the rod-integrator is inserted into the through-hole of the first reflecting plate such that the incident face of the rod-integrator protrudes from the reflection face of the first reflecting plate.

2. The lighting device according to claim 1, wherein the through-hole of the first reflecting plate is larger than the incident face of the rod-integrator.

3. The lighting device according to claim 1, wherein the light guiding section includes a light-traveling-path changing member for changing a traveling path of light from the light source before emitting the light toward the incident face of the rod-integrator,
   wherein the incident face of the rod-integrator confronts an exit face of the light-traveling-path changing member, and
   wherein the first reflecting plate is configured to reflect unnecessary light among outgoing light from the exit face of the light-traveling-path changing member, the unnecessary light not entering the incident face of the rod-integrator.

4. The lighting device according to claim 3, further comprising a second reflecting plate around an incident face of the light-traveling-path changing member for reflecting unnecessary light, the unnecessary light not entering the incident face of the light-traveling-path changing member.

5. The lighting device according to claim 1, wherein a holder for holding the rod-integrator is unitarily formed with a housing member of a housing for hermetically accommodating the rod-integrator, and wherein the housing member includes a fin-shaped heat radiator on a face defining an exterior of the housing.

6. A projection display apparatus comprising:
the lighting device according to claim 1;
an image forming element configured to be illuminated by the lighting device and form an image in response to a video signal; and
a projection lens for magnifying and projecting the image formed by the image forming element.

* * * * *